United States Patent [19]

Little

[11] 4,294,333
[45] Oct. 13, 1981

[54] OIL PAN ADAPTOR FOR INTERNAL COMBUSTION ENGINES

[76] Inventor: Barry S. Little, Mission Viejo, Calif.

[21] Appl. No.: 926,285

[22] Filed: Jul. 20, 1978

[51] Int. Cl.³ .......................... F02F 7/00; F16N 31/00
[52] U.S. Cl. ................................ 184/106; 123/195 C;
  123/198 E; 403/338
[58] Field of Search ............................. 184/106, 6.2;
  123/195 C, 198 E; 403/338

[56] References Cited

U.S. PATENT DOCUMENTS

| 1,185,487 | 5/1916 | Eastman | 403/338X |
| 2,837,063 | 6/1958 | Martinez | 123/195 C X |
| 2,837,075 | 6/1958 | Leach | 123/195 C |
| 2,978,265 | 4/1961 | Cluff et al. | 403/338 |
| 3,100,028 | 8/1963 | Booth | 184/106 |
| 3,211,256 | 10/1965 | Teutsch | 184/106 |
| 4,186,714 | 2/1980 | Danckert et al. | 123/195 C |

FOREIGN PATENT DOCUMENTS

| 363657 | 12/1921 | Fed. Rep. of Germany | 123/195 C |
| 964654 | 2/1950 | France | 184/106 |
| 1251459 | 12/1960 | France | 184/106 |

Primary Examiner—David H. Brown
Attorney, Agent, or Firm—Edward E. Roberts

[57] ABSTRACT

There is provided an adaptor for use with internal combustion engines which adaptor permits utilization of an improved oil pan. The improvement includes an adaptor for use with the oil pan, an improved oil pan configuration, a flange for use with the adaptor and a clamp for holding the pan to the adaptor and flange.

9 Claims, 11 Drawing Figures

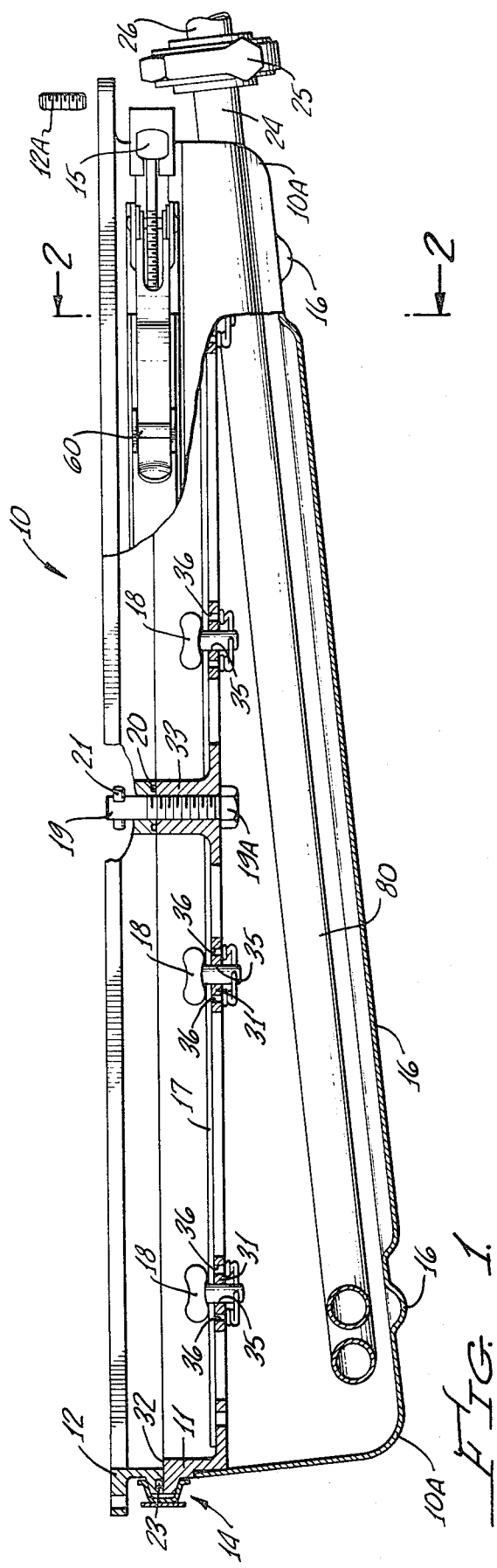
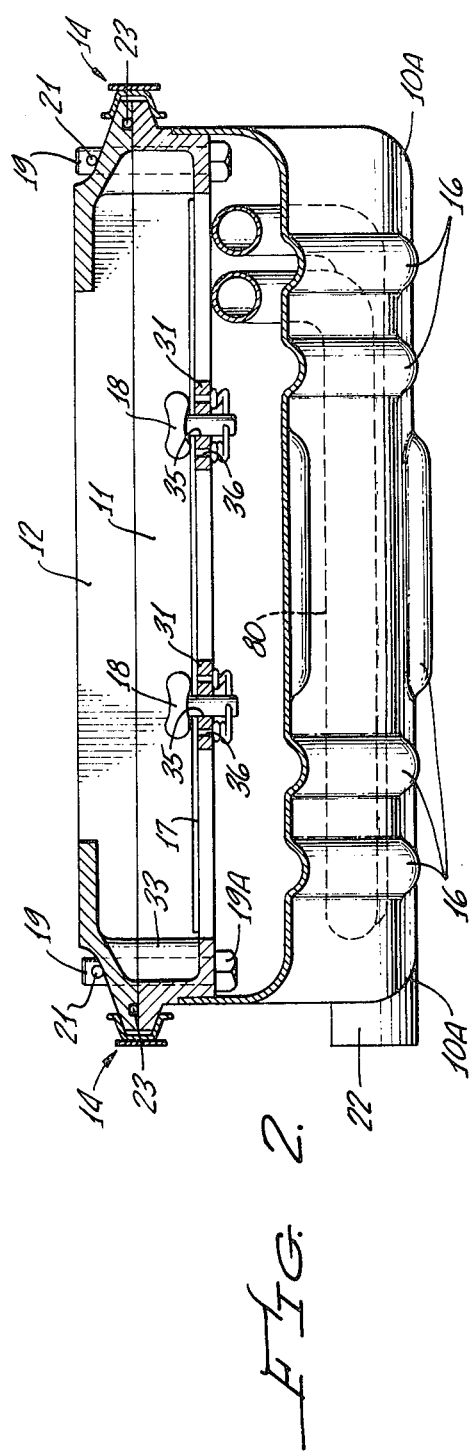

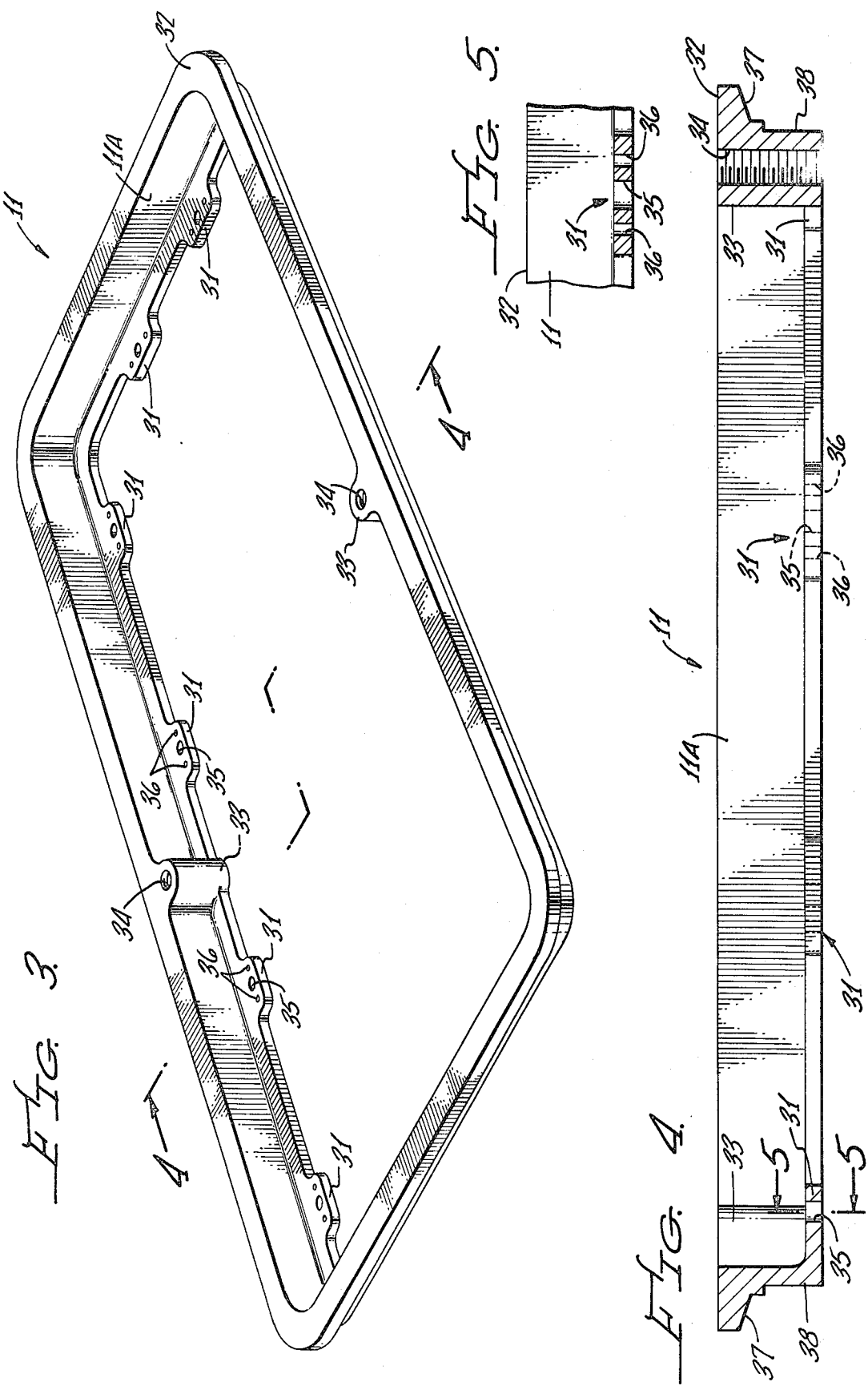

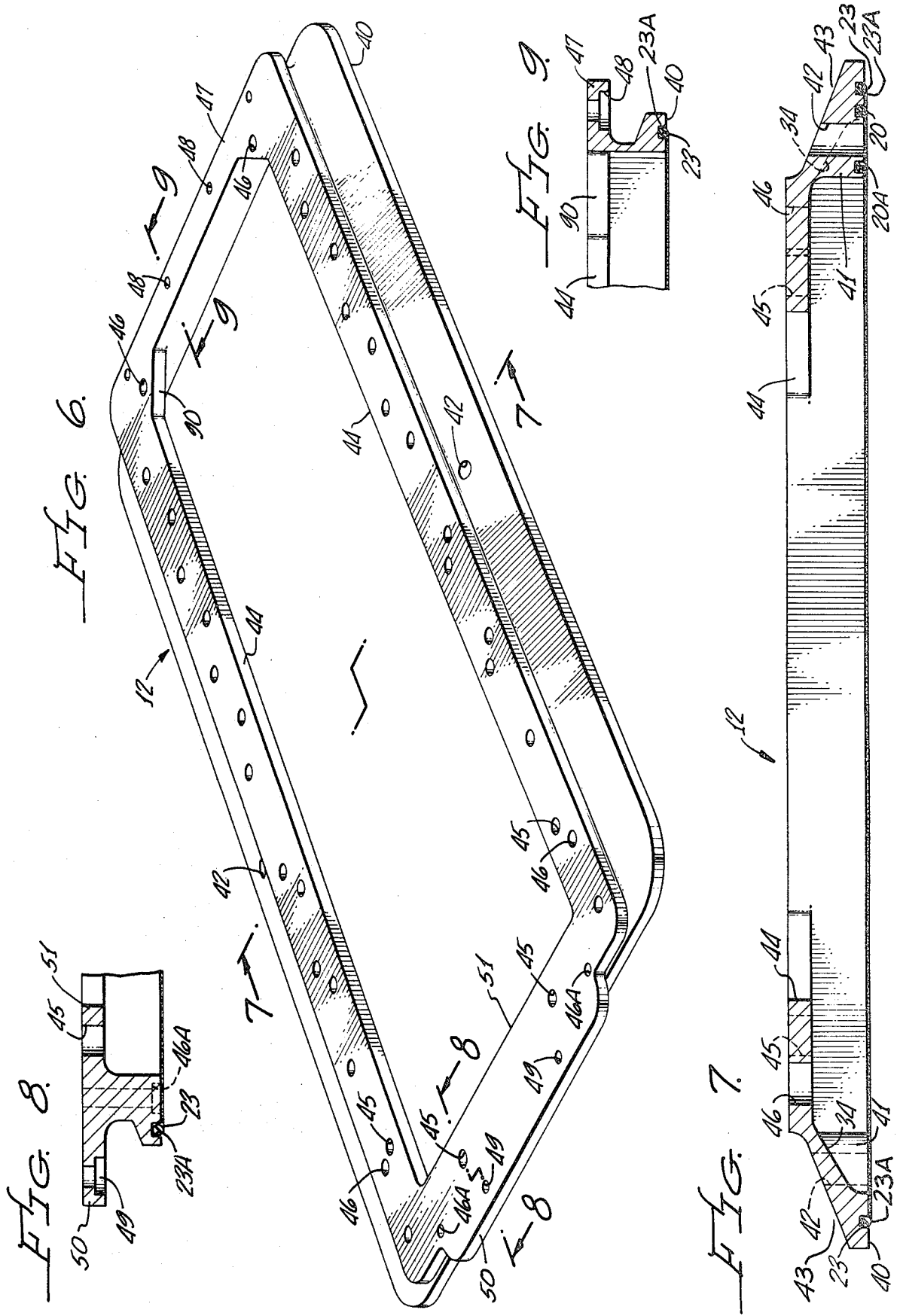

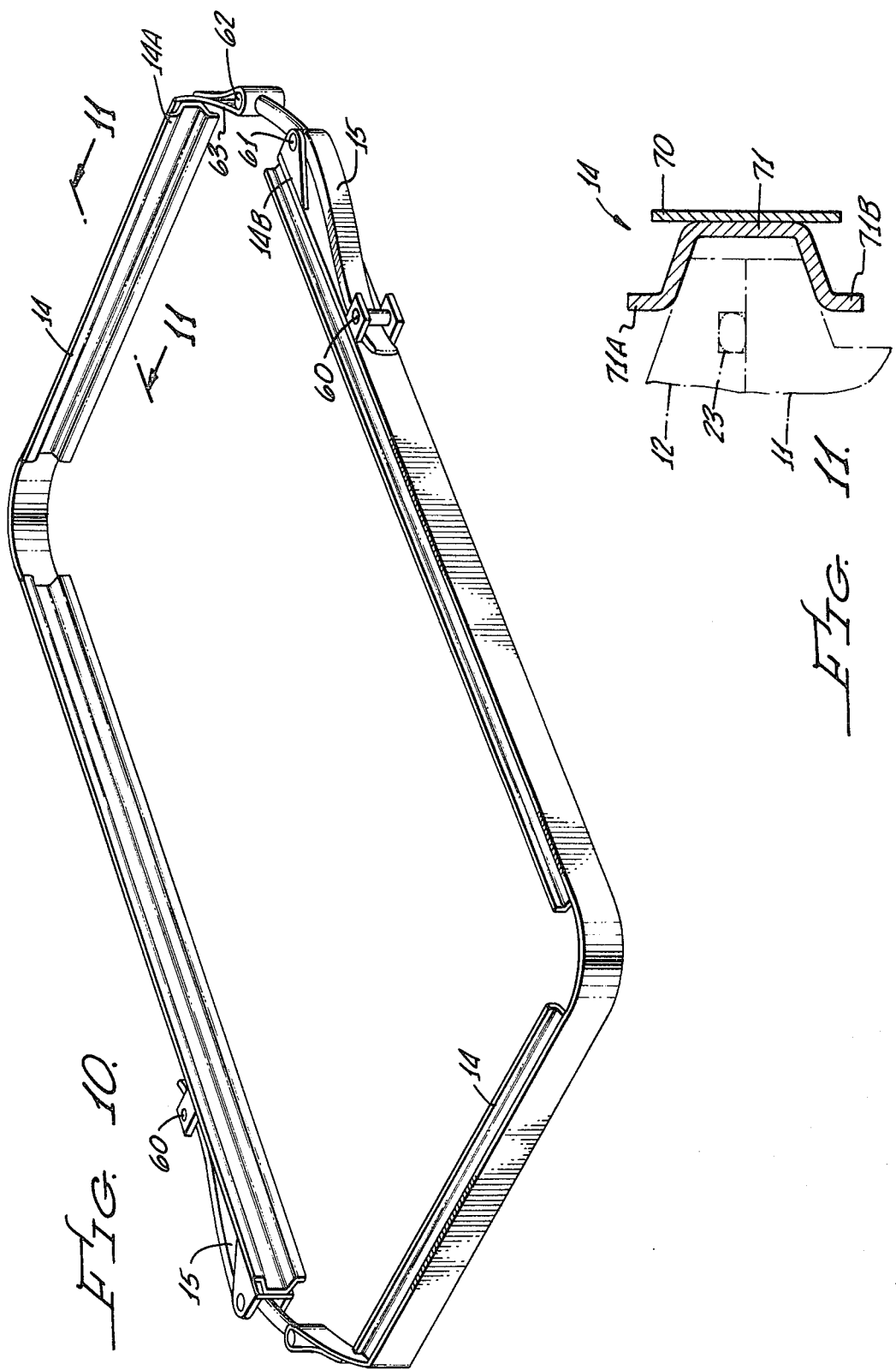

4,294,333

OIL PAN ADAPTOR FOR INTERNAL COMBUSTION ENGINES

BACKGROUND

1. Field of the Invention

This invention is directed to internal combustion engines, in general, and to improved oil reservoir or sump attachment apparatus for use therewith, in particular.

2. Prior Art

In typical prior art internal combustion engines, such as automobile gasoline engines and the like, there is usually provided an oil pan or crankcase. Typically, the oil pan is attached to the engine by means of bolts or the like which pass through a flange in the oil pan and into a flange in the gasoline engine. The oil pan usually contains a lubricant which is provided to the engine. The lubricant, after usage, typically becomes dirty and contaminated whereupon it is discarded. It is desirable to provide as much lubricant as possible and to assure that the lubricant is clean in order to permit satisfactory operation by the engine.

In addition, it is highly desirable to render the oil pan as accessible as possible in order to permit easy removal thereof when desirable.

PRIOR ART STATEMENT

The most pertinent reference which is known to applicant is U.S. Pat. No. 2,837,063 to Martinez, which provides a pair of removable jaws for clamping an oil pan flange to a motor flange wherein the jaws include apertures for mating with the oil pan flange.

SUMMARY OF THE INVENTION

The instant invention provides an improved oil pan which is used with an internal combustion engine. The oil pan permits improved flow to the engine of the lubricant stored therein. The oil pan is associated with a separate flange which can be mounted on an existing engine block. An adaptor is utilized to mate with the existing engine block and with the flange in order to permit mounting of the improved oil pan with the existing engine block. In addition, there is provided an over-center latch which is utilized to clamp the oil pan and flange to the adaptor. The clamp has a band with a reversed-roll and is formed into a channel to provide an improved mounting operation and to avoid mechanical problems therewith.

BRIEF DESCRIPTION OF THE DRAWINGS

FIG. 1 is a partially broken away, partially sectioned side view of the apparatus of the instant invention.

FIG. 2 is a partially broken away, partially sectioned end view of the apparatus of the instant invention.

FIGS. 3, 4 and 5 are, respectively, a perspective view, a cross-sectional end view and a cross-sectional view of a portion of the flange used in the instant invention.

FIGS. 6, 7, 8 and 9 are, respectively, a perspective view, a cross-sectional end view, and detailed cross-sectional views of opposite ends of the adaptor used in the instant invention.

FIG. 10 is a perspective view of the clamp used in the instant invention.

FIG. 11 is an enlarged, cross-sectional view of a portion of the clamp shown in FIG. 10.

DESCRIPTION OF THE PREFERRED EMBODIMENT

Referring now to FIGS. 1 through 11 in general there are shown partially broken away, cross-sectional side and end views of the instant invention. The apparatus includes oil pan 10 which is associated with flange 11 and adaptor 12. Oil pan 10 can have a sloping configuration wherein one end thereof is deeper than the other. This permits the oil or lubricant contained therein to flow toward one end which is especially desirable for draining or the like. Oil pan 10 includes dimples 16 which can be utilized to provide structural strength to the pan. Typically, the bottom portion of oil pan 10 is formed from an aluminum material in any suitable manner. A preferred manner is hydro-forming or a deep drawn method of producing the container. The pan need not be limited to aluminum but can be of any suitable material. However, aluminum provides relatively high strength with relatively low weight. The corners of the pan are shown rounded or radiused to provide improved movement of oil in the oil pan as compared to pans or containers which have square corners. While beads or dimples 16 are shown to provide stiffening or strengthening features, the beads could be placed in different locations and in fact, a waffled effect on the oil pan can be utilized.

In the preferred embodiment, shown in FIGS. 1 and 2, beads 16 are of a suitable configuration that, in effect, represents protruding beads. That is, the beads protrude from inside to outside of the pan. This configuration provides a surface on which can be mounted a reinforcing skid plate to prevent damage to the pan from external objects. Also, oil pump pick-up lines 80 are arranged in a suitable manner in oil pan 10. These lines provide means for the circulation of oil through pan 10 from an externally mounted oil pump. Pick-up lines 80 are connected via line 24 to a suitable source line 26. Lines 24 and 26 are coupled via a suitable quick release oil line assembly 25.

Flange 11 is typically a cast aluminum flange which can be dip-brazed (or otherwise affixed) to oil pan 10. Other methods of fabrication can be utilized. However, dip-brazing is generally utilized inasmuch as it is believed to be stronger and to cause less distortion, as well as being more economical than other methods such as welding. Flange 11 is designed such that windage tray 17 can be mounted therein. Typically, windage tray 17 is mounted in flange 11 by means of bolts, screws or quarter-turn fasteners 18 such as are shown in the embodiment of FIGS. 1 and 2. Of course, any desirable or suitable fastening element can be utilized. Moreover, fasteners 18 can be arranged in member 31.

A pair of alignment pins 19 are also provided relative to flange 11. Typically, the alignment pins are located on either side of the flange and pan arrangement. The alignment pins permit ready alignment with adaptor 12. In addition, by placing alignment pins 19 at the sides of the pan, they provide a rigid mechanical fastening apparatus which prevents the sides of pan 10 from flexing outwardly due to inner pressures during operation of the associated engine. Pins 19 may protrude through the upper casting of adaptor 12 if desired. If pins 19 do so protrude, O-ring 20 is provided in an annular seating trough around the pin in order to prevent oil from seeping out through the opening. In addition, an aperture can be drilled through pin 19 and an optional safety pin or cotter pin 21 can be inserted therethrough. The optional safety pin acts as a back-up system for clamp 14. That is, in the unlikely event that clamp 14 fails, pins 19 and 21 will maintain pan 10 in contact, albeit a loose contact, with the engine until the engine and vehicle can be brought to a relatively safe stop when oil pressure is diminished. Pins 19 are retained in place by nuts 19A which are threadedly engaged therewith.

Oil drain plug 22 is provided on either the left or right side (or underneath) pan 10. In FIG. 2, the drain is shown on the right side of the pan. However, the placement of the drain is a matter of engineering or other design preference. It should be understood that the windage dividers shown in FIGS. 1 and 2 are bolted or riveted to the cast flange 11 which can be dip-brazed to oil pan 10. This permits ready replacement or modification of the dividers at lesser expense than if they were spot welded or dip brazed in place.

Adaptor 12 is, typically, fabricated of magnesium, aluminum, or other light weight and high strength material. The adaptor is designed to be aligned with the existing factory provided oil pan holes in the engine or cylinder block. In those regions where smaller diameter bolts are used, a threaded reducing insert 12A can be incorporated into the adaptor. This adaptation has the advantage that the user is not required to modify the existing engine or cylinder block. Moreover, smaller diameter bolts can be used in these areas in order to avoid clearance problems regarding clamp 14 and O-ring 23 relative to the bottom of oil pan 10. Typically, adaptor 12 is configured and designed to be wider than normal to permit pan 10 to be wider and, thus, offer greater oil capacity without greater pan depth. The advantage of the increased oil capacity permits better cooling and increased oil supply for the engines vital moving parts.

The clamp includes a substantially V-shaped retainer clamp band 14 and overcenter latch handles 15. The overcenter latch handles in conjunction with the supporting mechanism shown in FIG. 10 prevent accidental opening of the clamp. The V-shaped clamp band 14 is arranged to conform with the angled portions of flange 11 and adaptor 12 so that these parts are mated together with O-ring 23 therebetween. Typically, two separate handles 15 are incorporated into the clamp (see FIG. 10). The handles are located at opposite corners of the apparatus of the instant invention in order to provide substantially equal tension around the entire clamp thereby to ensure proper mating of the elements. The handles 15 operate to apply tension in two directions at the same time wherein a tension is applied to clamp band 14 at the side and end of the apparatus of the instant invention.

The clamps have a reversed-roll formed into the channel or band as described hereinafter. This reversed-roll is highly desirable to restrict the clamp retainer band which has a normal tendency to bow away from the apparatus which could cause insufficient pressure along the sides of the pan.

Typically clamp band 14 is made of stainless steel which resists corrosion and is a rust preventative. This assures that the pivot points in the clamps and latch handles will be free moving. In addition, the stainless steel band provides relatively high strength material.

Referring now to FIG. 3, there is shown a perspective view of flange 11. Flange 11 includes an upper surface 32 which abuts the bottom surface of adaptor 12. On the inner surface 11A of the substantially rectangular flange member are two (or more) embossments 33 which include apertures 34 therein. The apertures in embossments 33 are adapted to receive alignment pins 19 as described supra. Also on the inner periphery of flange 11 are a plurality of shoulders 31 each of which includes an aperture 35 for receiving fastener 18 and a pair of holes 36 for pop-rivets or the like, which are used with fastener 18.

Referring to FIG. 4, there is shown a cross-sectional view of flange 11 as taken along the lines 4—4 of FIG. 3, wherein the shoulder 37 of flange 11 is seen. The shoulder is designed to have an angle of approximately 20 degrees (or any suitable arrangement) to mate with retainer band 14 as described supra. The arrangement of embossment 33 with threaded aperture 34 therethrough is shown. Likewise, shoulder 31 with apertures 35 and 36 are shown. Also shown in FIG. 4, is outer surface 38 of flange 11 to which is brazed oil pan 10 (not shown in FIGS. 3 and 4).

FIG. 5 shows a portion of flange 11, especially a detailed cross-section of shoulder 31 with apertures 35 and 36 therethrough. FIG. 5 is taken along the lines 5—5 of FIG. 4. In the embodiment shown in FIGS. 3, 4 and 5, flange 11 is approximately 23 inches long at the outer dimensions and approximately $\frac{3}{4}$ inches wide. Surface 32 is approximately 9/16 inch wide while surface 37 is approximately $\frac{5}{8}$ of an inch high. Shoulders 31 are approximately 3/16 of an inch thick and approximately $1\frac{1}{4}$ inches wide. The total depth or thickness of flange 11 from the bottom surface to top surface 32 is approximately 1 and $\frac{1}{8}$ inches.

Reference is made now to FIGS. 6 through 9. In particular, in FIG. 6 there is shown a perspective view of adaptor 12. Surface 40 is the surface which abuts with surface 32 of flange 11. Aperture 42 receives alignment pin 19, which extends through aperture 42 as indicated in FIGS. 1 and 2. Shoulder 44 includes a plurality of holes or apertures arranged therein to mate with the typical oil pan mounting holes in the engine block. Thus, appropriate bolts, screws and the like can be used to fasten adaptor 12 to the engine block. In the particular embodiment shown, there are, basically, two rows of holes 45 and 46. Holes 46 are, generally, arranged to mate with a 426 Chrysler engine. Holes 45 mate with a Donovan 417. Likewise, at the right end (in FIG. 6) of adaptor 12 is shoulder 47 which includes a plurality of countersunk holes 48 which receive mounting screws for the adaptor. At the left end of this embodiment is shoulder 50 which includes countersunk holes 49 which are also used to mount the adaptor to the engine block. Shoulder 51, at the left interior end of adaptor 12, is typically removed when the adaptor is used in certain applications such as with a Chrysler 426 engine. However, this shoulder is retained when used in the Donovan 417 application.

FIG. 7 is a cross-sectional end view of adaptor 12 taken along the line 7—7 in FIG. 6. FIG. 7 shows the elevation of the adaptor including tapered surface 43 and the relationship between the various surfaces and shoulders. Groove 23A in surface 40 is adapted to receive an O-ring or other suitable gasket 23 as shown in FIGS. 1 and 2. Groove 20A, which surrounds aperture 42, is adapted to receive O-ring 20 or other suitable gasket. Surface 43 (see FIG. 7) is essentially tapered in spatial relationship from surface 40 toward shoulder 44 which abuts with the engine block or motor in accordance with the instant invention. Also, as shown an aperture 42 is included in each embossment 41.

FIGS. 8 and 9 are cross-sectional views through the end portions of adaptor 12 taken along the lines 8—8 and 9—9, respectively, in FIG. 6. These views show the relationship between shoulder 44 and surface 40, as well as the relationship between holes 46A and 49 relative to the left end of adaptor 12.

In the embodiment shown and described relative to FIGS. 6–9, flange 12 is approximately 23⅛ inches long at the top surface thereof. Shoulders 50 and 51 extend about 1 inch beyond the major body of flange 12. Also flange 12 is about ⅞ inch thick from top to bottom. Shoulders 50 and 51 are about ¼ inch thick.

Referring now to FIG. 10, there is shown a perspective representation of the coupler and retainer 14 shown in FIG. 1. For the sake of simplicity the detailed description of only one of the handles 15 is shown. Handle 15 includes an overcenter latch which is of standard configuration. However, an optional safety pin 60 can be provided to prevent handle or latch 15 from inadvertently releasing. When handle 15 is rotated about pivot 61, end 62 applies pressure to and pulls on loop 63 in retainer band 14. This action has the effect of drawing retainer band ends 14A and 14B towards each other. The same operation occurs at both latches 15.

Referring now to FIG. 11, there is shown a cross-sectional view taken along the line 11—11 in FIG. 10. This cross-section shows the arrangement of retainer band 14 and the relationship therewith relative to flange 11 and adaptor 12. Retainer 14 comprises generally a U-shaped or grooved channel portion 71 which engages the edges of flange 11 and adaptor 12. In addition, retainer band 14 includes an outer band member 70 to add additional strength thereto. It is noted that retainer 71 includes the reversed-rolled portions 71A and 71B at the edges thereof. These rolled edged portions combine additional strength and rigidity to retainer 14 such that it does not bow under stress or pressure.

Thus, there has been shown and described an improved arrangement for oil pan adapting apparatus for internal combustion engines such as used with automobiles. The adaptor permits ready access to the oil pan for various and sundry operations. In addition, the apparatus permits an enlarged oil pan to be provided in order to enhance the lubricating capability relative to the engine in question. The embodiment shown and described in the attached figures is illustrative only and is not intended to be limitative. Rather, the invention is limited only by the claims appended hereto.

Having thus described a preferred embodiment of the invention, what is claimed is:

1. Lubricating apparatus comprising:
    pan means for containing a lubricant;
    adaptor means having a first surface for attachment to a device to be lubricated;
    flange means fastened to said pan means and positioned to connect said adaptor means to said pan means;
    quick release clamp means for securing said flange means to a second surface of said adaptor means; and
    said flange means comprising a collar-like device having a lip which is engaged by said clamp means, said collar-like device including shoulders for securing means thereto, and embossments for establishing securing means relative to said adaptor means.

2. The lubricating apparatus recited in claim 1 wherein:
    said clamp means includes at least one substantially U-shaped channel portion for securing said adaptor means to said flange means, said channel portion having reversed-rolled portions at the ends thereof for providing additional strength and rigidity to said clamp means.

3. The lubricating apparatus recited in claim 1 wherein;
    said adaptor means comprises a collar-like device having a lip which is engaged by said clamp means, and
    removable shoulder means for adjusting the size of said adaptor means.

4. The lubricating apparatus recited in claim 1 wherein;
    said adaptor means comprises tapered sides for enlarging the opening defined by said second surface for accommodating over-sized pan means.

5. The lubricating apparatus recited in claim 4 wherein;
    said flange means includes a removeable windage tray mounted therein.

6. The lubricating apparatus recited in claim 1 wherein;
    said clamp means includes a U-shaped band for engaging portions of said flange means and said adaptor means, and
    at least one over center clamp apparatus device.

7. The lubricating apparatus recited in claim 6 wherein and includes
    said pan is deeper at one end than at the other end;
    drain means in said pan at said one end.

8. The lubricating apparatus recited in claim 6 wherein;
    said flange means and said adaptor means each include at least one alignment means for aligning said adaptor means to said flange means.

9. The lubricating apparatus recited in claim 6 wherein;
    said clamp means includes a plurality of over-center clamp apparatus devices, and
    safety pin means for securing said clamp apparatus devices.

* * * * *